Jan. 20, 1959 G. M. GOOD 2,869,915
GOLF COURSE DIVOT REPLACING TOOL
Filed Nov. 8, 1955 2 Sheets-Sheet 1
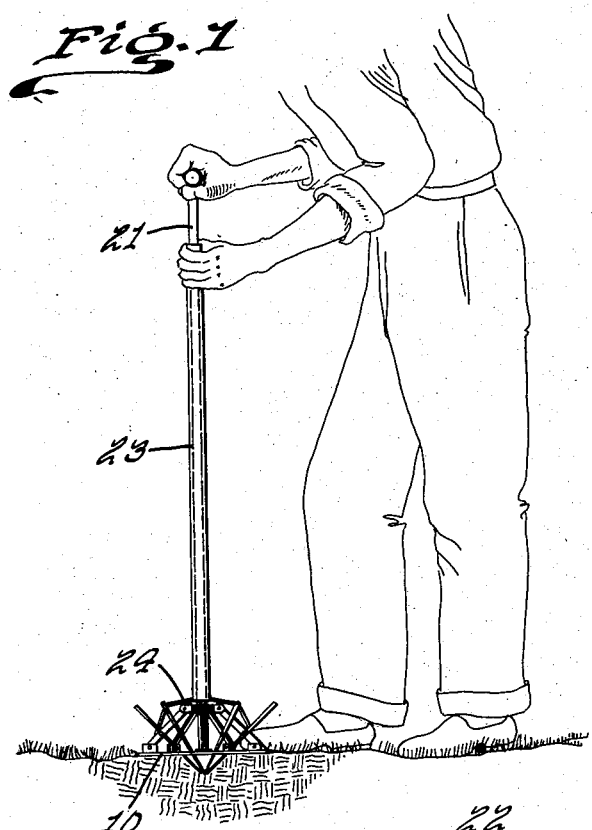
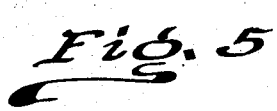
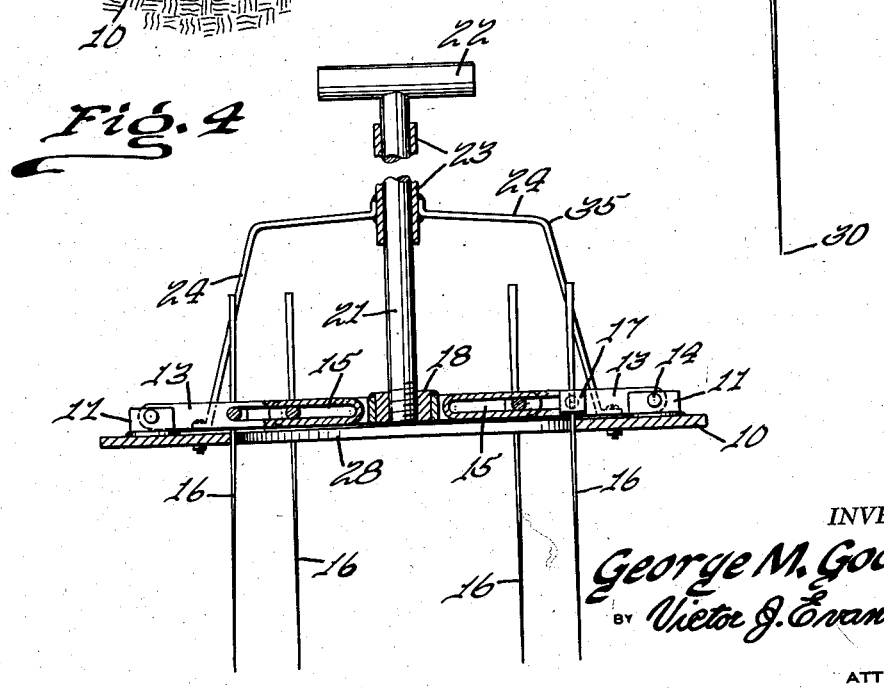
INVENTOR.
George M. Good
BY Victor J. Evans & Co.
ATTORNEYS Jan. 20, 1959

G. M. GOOD 2,869,915

GOLF COURSE DIVOT REPLACING TOOL

Filed Nov. 8, 1955

INVENTOR.
George M. Good
BY Victor J. Evans & Co.

ATTORNEYS

United States Patent Office 2,869,915
Patented Jan. 20, 1959

2,869,915

GOLF COURSE DIVOT REPLACING TOOL

George M. Good, Taft, Calif.

Application November 8, 1955, Serial No. 545,627

4 Claims. (Cl. 294—50.6)

This invention relates to tools for maintaining golf course greens, and in particular a tool for repairing divots that are indented into the surface by the ball when the ball lands on the green.

The purpose of this invention is to provide a tool for repairing divots in greens on golf courses without bending over.

An attendant repairing divots in openings of golf course greens is required to bend over to the ground to repair a divot. Repeating this process continuously throughout a day is very tiring and the continuous action of bending to the ground is hard on the back of the attendant. With this thought in mind this invention contemplates a tool having a plurality of prongs positioned in a circle and adapted to be actuated by a vertically disposed handle whereby upon pressing the prongs downwardly with the prongs in vertically disposed positions into the green, and drawing upwardly on the handle the prongs are actuated inwardly to close a divot, where a ball tears grass away. Pushing downwardly on handle releases the prongs so the tool can be pulled free after divot is repaired.

The object of this invention is, therefore, to provide a divot replacing tool that is adapted to be operated by an attendant with the attendant in the standing position.

A further object of the invention is to provide a divot restoring tool which is of a simple and economical construction.

With these and other objects and advantages in view the invention embodies a base plate having an enlarged opening in the center with arms having elongated tines adjustably mounted therein pivotally mounted on the base plate, a spider having spaced radially disposed bars with the ends of the bars pivotally connected to the arms mounted on the base plate, a handle extended from the spider, and a sheath positioned around the handle and in which the handle is adapted to slide vertically, secured to the base plate with radially disposed legs.

Other features and advantages of the invention will appear from the following description taken in connection with the drawings, wherein:

Figure 1 is a side elevational view illustrating the improved divot repair tool showing the tool held in the hand of an attendant and showing the tines in the position for closing a divot.

Figure 4 is a vertical section, similar to that taken on line 3—3 of Figure 2 showing the parts with the handle depressed and with the tines vertically positioned.

Figure 5 is section taken on line 5—5 of Figure 3 with the parts shown on a still further enlarged scale illustrating the mounting of one of the tines.

Figure 2:
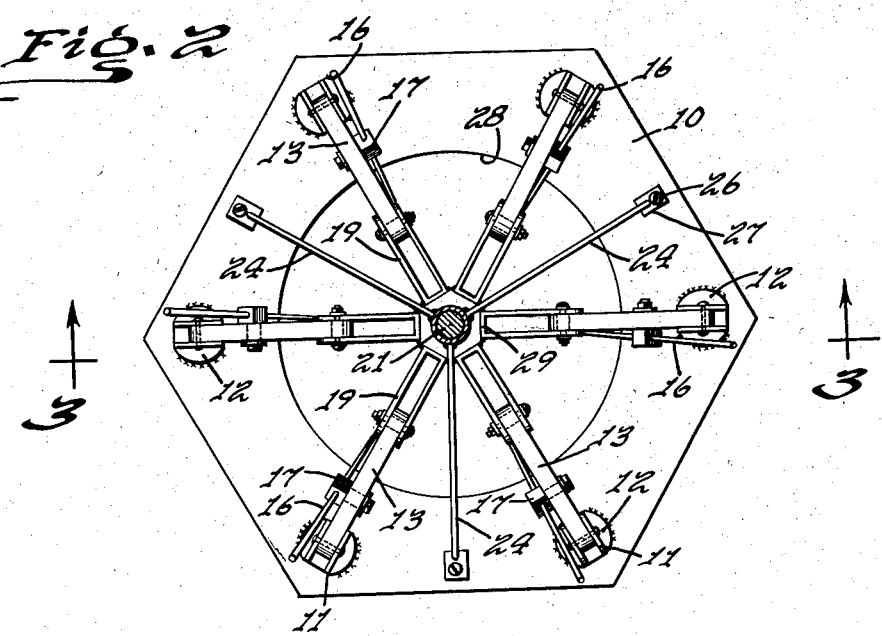
Figure 2 is a sectional plan through the handle of the tool with the parts in the position as shown in Figure 1, and with the parts shown on an enlarged scale.
Figure 3:
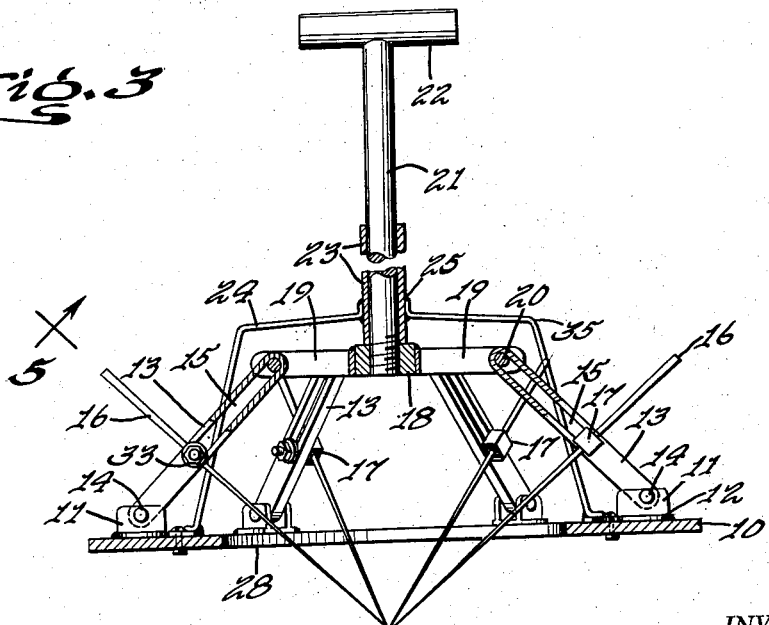
Figure 3 is a vertical section taken on line 3—3 of Figure 2 also showing the parts in the positions as illustrated in Figure 1 and with parts broken away.

Referring now to the drawings wherein like reference characters denote corresponding parts the improved divot repairing tool of this invention includes a base plate 10 having spaced ears 11 extended upwardly from plates 12 secured to the upper surface of the base plate, such as by welding, arms 13 pivotally mounted by pins 14 in the ears 11 and having slots 15 in upper parts thereof, tines 16 carried by sockets 17 adjustably mounted in the slots 15 of the arms, a spider 18 having a nut forming a hub with spaced bars 19 extended therefrom and to the ends of which the arms 13 are pivotally connected with pins 20, a vertically disposed rod 21 threaded in the hub of the spider 18 and having a handle 22 on the upper end, a sheath 23 in which the rod 21 is slidably mounted, and legs 24, the upper ends of which are secured to the sheath 23 such as by welding, as shown at the point 25 and the lower ends of which are secured to the base plate with screws 26 extended through flanges 27 on the lower ends thereof.

The mounting or base plate 10 is provided with an enlarged circular opening 28 in the center, and in the design shown, is of hexagonal shape and although the device is provided with six tines it will be understood that any suitable number of tines may be used and the periphery of the base plate may be of any suitable shape.

The lower ends of the arms 13 are pivotally mounted between the ears 11 of the mounting plate 10 with the pins 14 and the upper ends are positioned between the bars 19 to which they are pivotally connected with the pins 20. The spaced bars 19 are secured to flat surfaces 29 of the hub 18, such as by welding, and with the pins 20 positioned in the slots 15 of the arms 13 the pins are adapted to slide outwardly in the slots to the positions shown in Figure 4 as the handle is moved downwardly.

The tines 16, which taper to points 30 at the lower ends are secured in openings 31 of heads of the sockets 17 and, as illustrated in Figure 5 the sockets are provided with threaded studs 32 which extend through the slots 15 of the arms 13 and which are adapted to be clamped in position in the arms with nuts 33 and washers 34.

The legs 24, which provide supporting structure for the handle on the base 10, extend outwardly from the sheath 23 to points 35, from which points the legs extend downwardly to the flanges 27 by which the superstructure is secured to the base 10 with the screws 26.

With the parts designed and assembled as shown and described an attendant carries the tool by the sheath 23 and, as illustrated in Figure 1, the base plate is positioned over a divot with the tines extended vertically downwardly as shown in Figure 4, and with the tines surrounding the divot and inserted into the green, the handle is drawn upwardly drawing the pointed ends of the tines inwardly, such as the fingers of a hand, drawing the grass upwardly and thereby repairing the divot. The tines being carried by the end of a telescoping handle are, therefore, readily actuated to repair divots with the attendant remaining in an upright position.

It will be understood that modifications, within the scope of the appended claims, may be made in the design and arrangement of the parts without departing from the spirit of the invention.

What is claimed is:

1. In a divot repair tool, the combination which comprises a horizontally disposed base plate, said plate having an opening therethrough, inclined radially disposed arms extended upwardly from the base plate, means for pivotally connecting lower ends of the arms to the base plate, a vertically disposed rod extended upwardly from the point in the center of the base plate providing a handle, a spider having radially disposed bars positioned on the lower end of the rod, means pivotally connecting upper ends of the inclined arms to extended ends of the bars of the spider, tines mounted on the arms and depending therefrom, a sheath slidably mounted on the vertically disposed rod, and means rigidly connecting the sheath to the base plate.

2. In a divot repair tool, the combination which comprises a horizontally disposed base plate, said plate having an opening therethrough, inclined radially disposed arms extended upwardly from the base plate, means for pivotally connecting lower ends of the arms to the base plate, a vertically disposed rod extended upwardly from the point in the center of the base plate providing a handle, a spider having radially disposed bars positioned on the lower end of the rod, means pivotally connecting upper ends of the inclined arms to extended ends of the bars of the spider, tines mounted on the arms and depending therefrom, a sheath slidably mounted on the vertically disposed rod, and radially disposed outwardly and downwardly extended legs secured, such as by welding, to the sheath and base plate providing rigid connecting means between the sheath and base plate.

3. In a divot repair tool, the combination which comprises a horizontally disposed base plate, said base plate having an opening therethrough, inclined radially disposed arms having elongated slots in upper parts thereof extended upwardly from the base plate, means for pivotally connecting lower ends of the arms to the base plate, a vertically disposed rod extended upwardly from a point in the center of the base plate, a spider having a hub with spaced bars extended radially therefrom positioned on the lower end of the rod, means pivotally connecting extended ends of the bars of the hub to upper ends of the inclined arms, tines having pointed lower ends mounted on the arms and depending therefrom, a sheath slidably mounted on the vertically disposed rod, and outwardly and downwardly disposed legs rigidly connecting the lower end of the sheath to the base plate with the legs positioned between the arms.

4. In a divot repair tool, the combination which comprises a horizontally disposed base plate, said plate having an opening therethrough, bearings mounted on and extended upwardly from said base plate, radially disposed inclined arms having elongated slots in upper ends thereof extended upwardly from the base plate, means pivotally mounting the lower ends of the arms on the bearings on said base plate, a vertically disposed rod having a handle on the upper end extended upwardly from the base plate, a spider having radially disposed bars extended therefrom on the lower end of the rod, pins mounted in extended ends of the bars of the spider and extended through elongated openings of the arms, a sheath slidably mounted on the rod, elongated tines with pointed lower ends adjustably mounted on the arms and positioned normal to said arms and radially disposed outwardly and downwardly extended legs connecting the sheath to the base plate whereby with the sheath held in one hand the tines are actuated by the handle of the rod for picking up and dropping a divot.

References Cited in the file of this patent

UNITED STATES PATENTS

| | | |
|---|---|---|
| 682,021 | Bennett | Sept. 3, 1901 |
| 1,167,785 | Searcy et al. | Jan. 11, 1916 |
| 1,220,481 | Wedge | Mar. 27, 1917 |
| 2,474,374 | Shuttuck | June 28, 1949 |
| 2,585,298 | Coelho | Feb. 12, 1952 |

FOREIGN PATENTS

| | | |
|---|---|---|
| 87,052 | Norway | Jan. 7, 1956 |